United States Patent
Hubbard et al.

(10) Patent No.: US 6,364,811 B1
(45) Date of Patent: Apr. 2, 2002

(54) MODEL-BASED TRANSMISSION UPSHIFT CONTROL WITH ENGINE TORQUE MANAGEMENT

(75) Inventors: Gregory A Hubbard, Carmel; Jeffrey Kurt Runde, Fishers; Larry Theodore Nitz, Carmel; Timothy Alan Robinson, Avon; Todd M Steinmetz, Indianapolis, all of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/598,283

(22) Filed: Jun. 22, 2000

Related U.S. Application Data

(63) Continuation-in-part of application No. 09/528,609, filed on Mar. 20, 2000.

(51) Int. Cl.[7] .............................................. F16H 61/04
(52) U.S. Cl. ........................ 477/143; 477/107; 477/156
(58) Field of Search ................................ 477/107, 143, 477/156, 164

(56) References Cited

U.S. PATENT DOCUMENTS

| | | |
|---|---|---|
| 4,070,927 A | 1/1978 | Polak |
| 4,707,789 A | 11/1987 | Downs et al. ............ 364/424.1 |
| 4,724,723 A | 2/1988 | Lockhart et al. |
| 5,058,460 A | 10/1991 | Hibner et al. |
| 5,086,670 A * | 2/1992 | Nitz et al. .................. 477/143 |
| 5,123,302 A * | 6/1992 | Brown et al. |
| 5,129,286 A | 7/1992 | Nitz et al. |
| 5,601,506 A | 2/1997 | Long et al. ................. 475/120 |
| 6,032,095 A * | 2/2000 | Ochi et al. .................. 477/138 |

\* cited by examiner

*Primary Examiner*—Sherry Estremsky
(74) *Attorney, Agent, or Firm*—Leslie C. Hodges

(57) ABSTRACT

An improved control for an automatic transmission upshift, wherein the engine output torque and on-coming clutch pressure are coordinated during the shift based on an inverse dynamic model of the transmission to achieve a desired output torque trajectory. The desired output torque trajectory is influenced by operator demand, and an initial value of the desired output torque trajectory is used along with the engine output torque to develop an input acceleration trajectory. The inverse dynamic model of the transmission is used (1) to determine an engine torque command that will achieve both the input acceleration trajectory and the desired output torque trajectory, and (2) to determine a feed-forward pressure command for the on-coming clutch that will produce the input acceleration trajectory, given the engine torque command. The desired output torque trajectory and the engine output torque are used to determine the expected input speed, and a feed-back control term based on the deviation of the measured input speed from the expected input speed is used to adjust the on-coming clutch pressure command to account for model errors. Finally, the closed-loop feedback error is used to enable adaptive correction of the feed-forward control so that the feed-forward clutch pressure more nearly produces the commanded input shaft acceleration.

5 Claims, 5 Drawing Sheets

| RANGE | CLUTCH | | | | |
|---|---|---|---|---|---|
| | C1 | C2 | C3 | C4 | C5 |
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

MODEL-BASED TRANSMISSION UPSHIFT CONTROL WITH ENGINE TORQUE MANAGEMENT

RELATED APPLICATIONS

This is a continuation-in-part of co-pending U.S. patent application Ser. No. 09/528,609, filed on Mar. 20, 2000, and assigned to the assignee of the present invention.

TECHNICAL FIELD

This invention relates to a model-based upshift control for an automatic transmission, and more particularly to a control that manages both engine torque and on-coming clutch pressure.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset. Shifting from a currently established speed ratio to new speed ratio involves, in most cases, disengaging a clutch (off-going clutch) associated with the current speed ratio and engaging a clutch (on-coming clutch) associated with the new speed ratio.

It is well known that transmission shifting can be controlled by manipulating the clutch pressures and the engine torque output during the shift for improved shift quality and transmission durability. See, for example, the Lockhart et al. U.S. Pat. No. 4,724,723, assigned to the assignee of the present invention, and Nitz et al. U.S. Pat. No. 5,129,286, assigned to Saturn Corporation. Nitz et al. use open-loop engine output torque controls to suppress engine flare during low torque upshifting, while Lockhart et al. employ closed-loop engine torque and on-coming clutch pressure controls to maintain a desired constant output torque. Other open-loop and closed-loop clutch pressure controls are respectively described in the Downs et al. U.S. Pat. No. 4,707,789 and Hibner et al. U.S. Pat No. 5,058,460, both of which are assigned to the assignee of the present invention.

SUMMARY OF THE INVENTION

The present invention is directed to an improved control for an automatic transmission upshift, wherein the engine output torque and on-coming clutch pressure are coordinated during the shift based on an inverse dynamic model of the transmission to achieve a desired output torque trajectory. The desired output torque trajectory is influenced by operator demand, and an initial value of the desired output torque trajectory is used along with the engine output torque to develop an input acceleration trajectory. The inverse dynamic model of the transmission is used (1) to determine an engine torque command that will achieve both the input acceleration trajectory and the desired output torque trajectory, and (2) to determine a feed-forward pressure command for the on-coming clutch that will produce the input acceleration trajectory, given the engine torque command. The desired output torque trajectory is used to determine the expected input speed, and a feed-back control term based on the deviation of the measured input speed from the expected input speed is used to adjust the on-coming clutch pressure command to account for model errors. Finally, the closed-loop feedback error is used to enable adaptive correction of the feed-forward control so that the feed-forward clutch pressure more nearly produces the commanded input shaft acceleration. Coordinating the on-coming pressure and engine output torque in this manner achieves more consistent shift feel and energy dissipation in the on-coming clutch, with less intensive calibration effort and improved adaptability to different powertrain an vehicle-type configurations.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
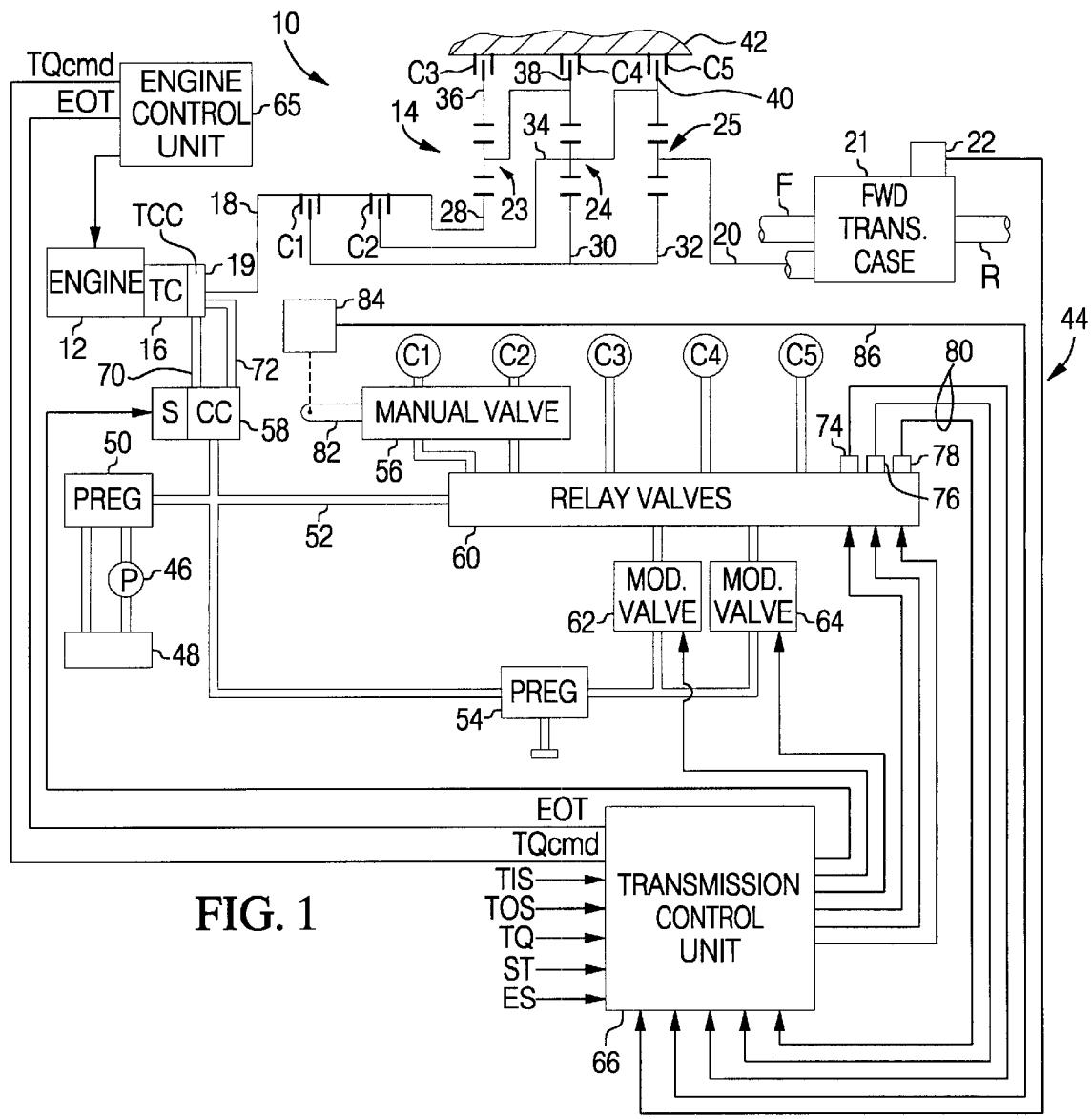
FIG. 1 is a diagram of an automatic transmission a microprocessor-based control unit for carrying out the control of this invention.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the engine control unit 65 and the transmission control unit 66, illustrated in FIG. 1 as two separate modules. Both control units 65, 66 are microprocessor-based, and may be conventional in architecture. The engine control unit 65 controls the operation of engine functions such as fuel, spark timing, and so on depending on the control variables afforded by engine 12, and the transmission control unit 66 controls the solenoid operated fluid control valves 58–64 based on a number of inputs to achieve a desired transmission speed ratio. The transmission control unit inputs include signals representing the transmission input speed TIS, a driver torque command TQ, and the transmission output speed TOS. Sensors for developing such signals may be conventional in nature, and have been omitted for simplicity. Additionally, the engine control unit 65 supplies an engine output torque signal EOT to transmission control unit 66, and transmission control unit 66 supplies a torque command signal TQcmd to engine control unit 65.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch, develops corresponding force motor current commands, and then supplies current to the respective force motors in accordance with the current commands.

Figure 3:
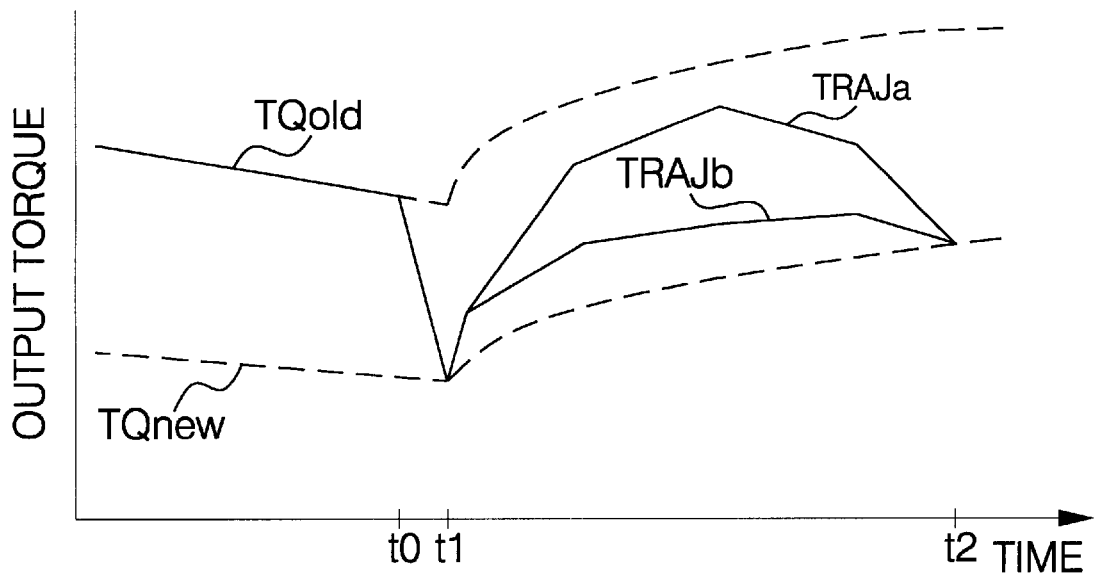
FIG. 3 graphically depicts the output torque of the transmission of FIG. 1 during a power-on upshift.

FIG. 3 graphically depicts the output torque of transmission 14 during a power-on upshift. Prior to the torque phase of the shift, the output torque follows a trajectory TQold determined by the product of input torque and the old (current) speed ratio, whereas after the shift is completed, the output torque follows a trajectory TQnew determined by the product of the input torque and the new speed ratio. In the torque phase of the shift, the torque carried by the off-going clutch transitions to the on-coming clutch, and the output torque transitions from the TQold trajectory to the TQnew trajectory in the time interval t0–t1. In the inertia phase of the shift (time interval t1–t2), the engine 12 is decelerated to its post-shift speed, and the output torque rises above the TQnew trajectory to a variable degree depending on the input torque and the on-coming clutch pressure.

The trajectory of the output torque during the inertia phase determines, in large part, what is referred to as the shift-feel. A high output torque trajectory such as the trajectory TRAJa will produce a firm shift-feel, whereas a low output torque trajectory such as the trajectory TRAJb will produce a soft shift-feel. In many control strategies, the various control parameters are scheduled to produce a shift-feel that is appropriate for the driver torque demand— firmer shift-feel at higher torque demand, and softer shift-feel at lower torque demand. Also, driver preferences may be taken into account, with Normal and Towing modes, for example. In open-loop controls such as described in the above-mentioned U.S. Pat. Nos. 4,707,789 and 5,129,286, the desired shift-feel is scheduled by suitable calibration of the on-coming clutch pressure profile. In closed-loop controls such as described in the above-mentioned U.S. Pat. Nos. 4,724,723 and 5,058,460, the desired shift feel is scheduled by forcing a speed or torque parameter to follow a predetermined trajectory. The open-loop approach is inherently calibration intensive, and generally un-suited to applications involving several different engine and vehicle configurations. The closed-loop approach is hampered by hydraulic delays, and frequently exhibits considerable error between the predetermined trajectory and the corresponding measured parameter. In either approach, it is extremely difficult to achieve coordinated control of both the on-coming clutch pressure and engine output torque.

The present invention utilizes an inverse dynamic model of the transmission to achieve a desired shift-feel with a coordinated control of the engine output torque and the on-coming clutch pressure. Operator demand, mode and vehicle loading characteristics are used to develop a desired output torque trajectory TRAJout_tq corresponding to the desired shift feel. The output torque trajectory is be conveniently implemented with a scale factor Ksf having a profile that defines the output torque trajectory in terms of the trajectories TQold and TQnew. That is, the desired output torque trajectory TRAJout_tq may be defined as:

$$TRAJout\_tq=Ksf(TQold-TQnew)+TQnew$$

Figure 4:
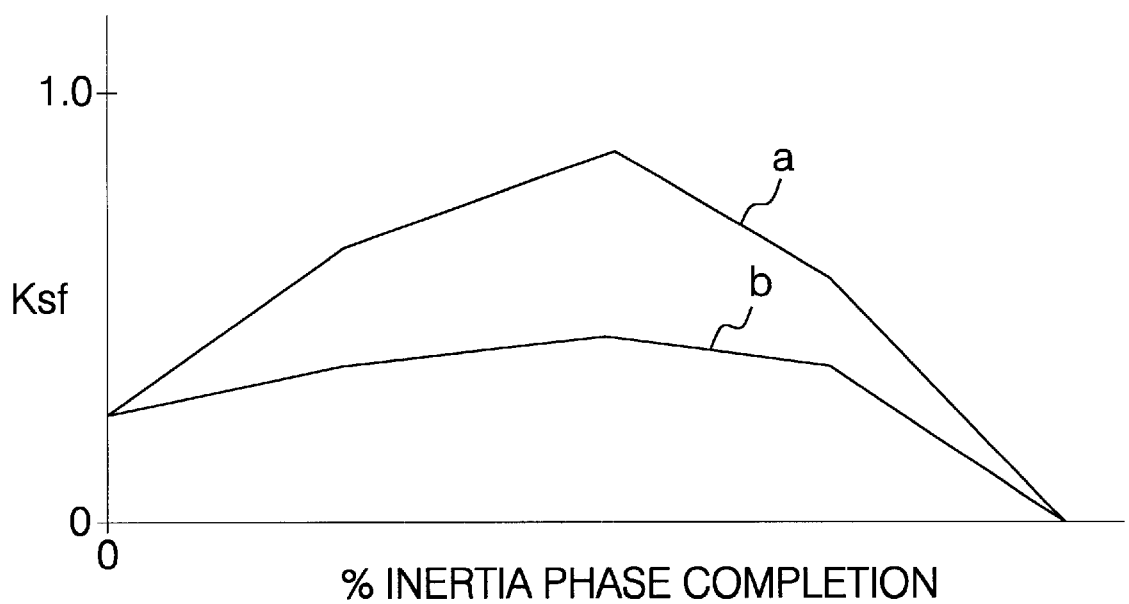
FIG. 4, graphically depicts a scale factor used in the development of a desired output torque trajectory.

In this approach, the Ksf can be determined by table look-up as a function of driver torque demand (throttle position, for example) and the time fraction of inertia phase completion. FIG. 4 shows two exemplary scale factor profiles corresponding to the two inertia phase output torque traces of FIG. 3. In particular, the scale factor profile a corresponds to the output torque trajectory TRAJa, and the scale factor profile b corresponds to the output torque trajectory TRAJb.

Figure 5:
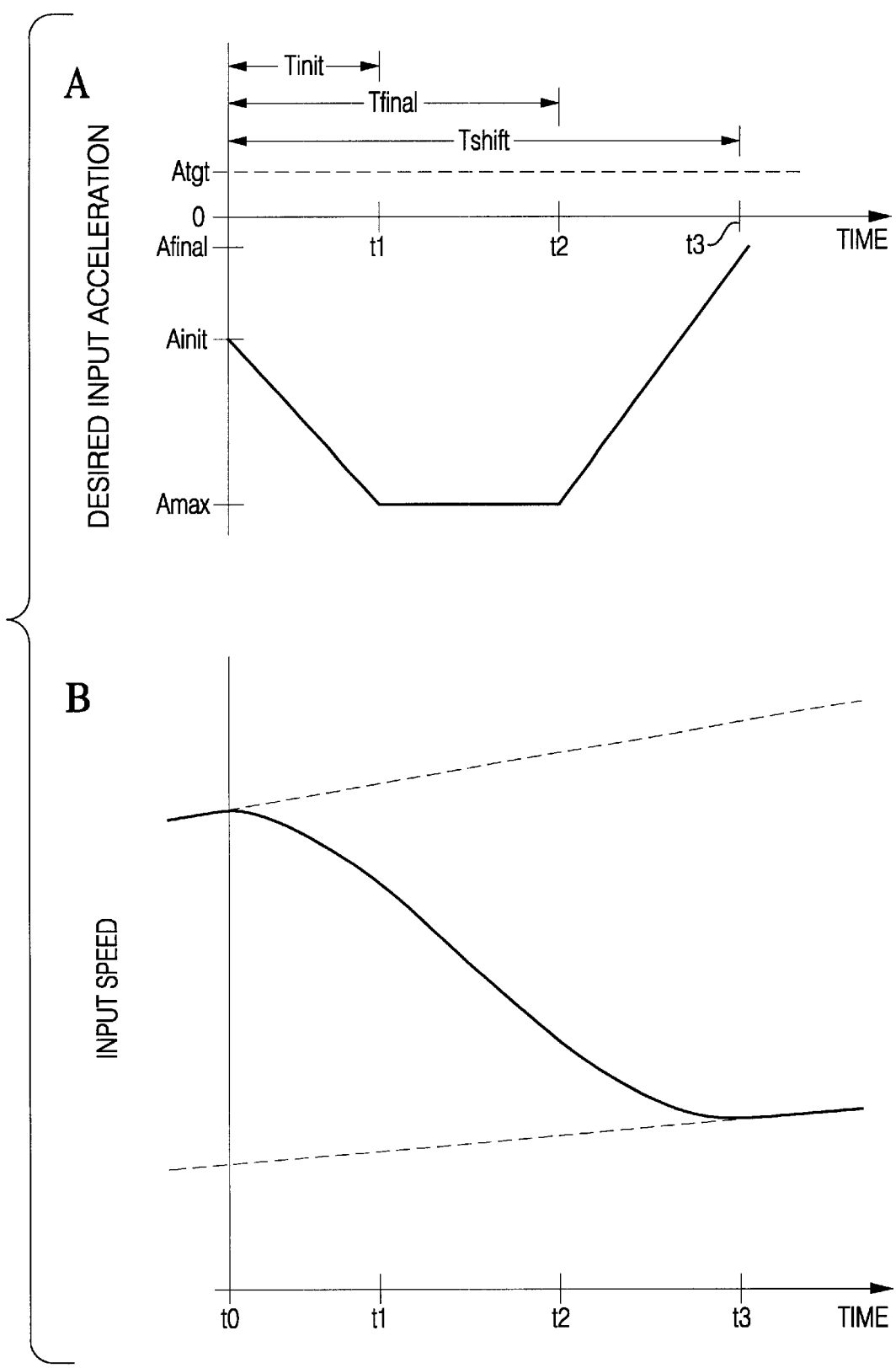
FIG. 5, Graphs A and B, depict the inertia phase of an upshift according to this invention. Graph A depicts a desired acceleration trajectory of the input shaft, and Graph B depicts the corresponding speed trajectory of the input shaft.

An initial value TQout(des_init) of the output torque trajectory TRAJout_tq is used to develop an input acceleration trajectory TRAJin_accel. Referring to FIG. 5, Graph A depicts the input acceleration trajectory TRAJin_accel for the inertia phase of a power-on upshift from a current speed ratio SRold to a new speed ratio SRnew, assuming a constant output acceleration Aout during the shift, and Graph B depicts a corresponding input speed profile. In practice, the output acceleration Aout may vary during a shift, as explained below. As seen in Graph B, the input speed prior to the inertia phase is determined by the product TOS * SRold, whereas the input speed at the conclusion of the inertia phase is determined by the product TOS * SRnew.

The parameters of the acceleration trajectory of Graph A include the initial acceleration Ainit, the maximum acceleration Amax, the final acceleration Afinal, and the times Tinit, Tfinal, and Tshift. The terms Ainit and Amax are determined based on measured parameters, while the terms Afinal, Tinit, Tfinal and Tshift are determined by calibration as a function of one or more other parameters. For example, Tshift may be determined as a function of driver torque demand TQ, whereas Tinit and Tfinal may be predetermined percentages of Tshift. The value of Afinal is a calibrated value selected to achieve smooth shift completion. The target acceleration Atgt represents the input shaft acceleration at the conclusion of the inertia phase, and is determined according to the product (Aout * SRnew). As explained more fully below in reference to FIG. 6A, Ainit is computed based on the transmission input torque TQin and the desired output torque OTdes at the end of the torque phase, and Amax is computed based on the acceleration trajectory parameters and speed difference across the on-coming clutch, referred to herein as the slip speed.

According to the present invention, the inverse dynamic model of the transmission is used, on one hand, to determine an engine torque command TQcmd that will achieve both the input acceleration trajectory TRAJin_accel and the desired output torque trajectory TRAJout$_{13}$ tq, and on the other hand, to determine a feed-forward pressure command Ponc_FF for the on-coming clutch that will produce the input acceleration trajectory TRAJin_accel, given the engine torque command TQcmd. In other words, the transmission model is used to determine coordinated feed-forward control of both the on-coming clutch pressure and engine output torque.

The desired output torque trajectory TRAJout_tq is also used to determine the expected input speed TISexp, and a feed-back control term Ponc_FB based on the deviation of the measured input speed TIS from the expected input speed TISexp is used to adjust the on-coming clutch pressure command Ponc to account for model errors. Finally, the closed-loop feedback error ERR is used to enable adaptive correction of the feed-forward control so that the feed-forward clutch pressure Ponc_FF more nearly produces the commanded input shaft acceleration.

Figure 6A:
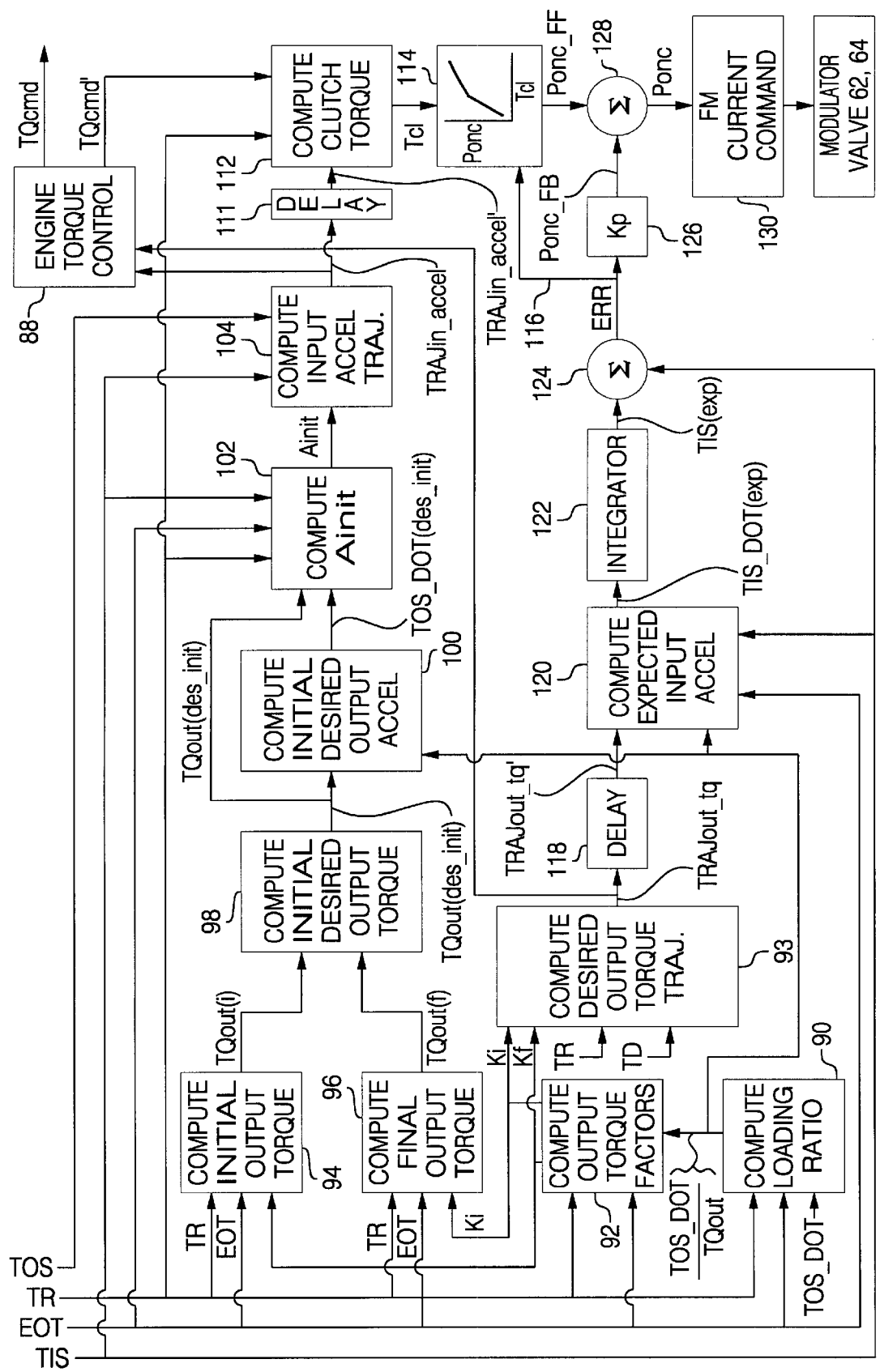
FIGS. 6A and 6B depict a block diagram of the control carried out by the control unit of FIG. 1 according to this invention.
Figure 6B:
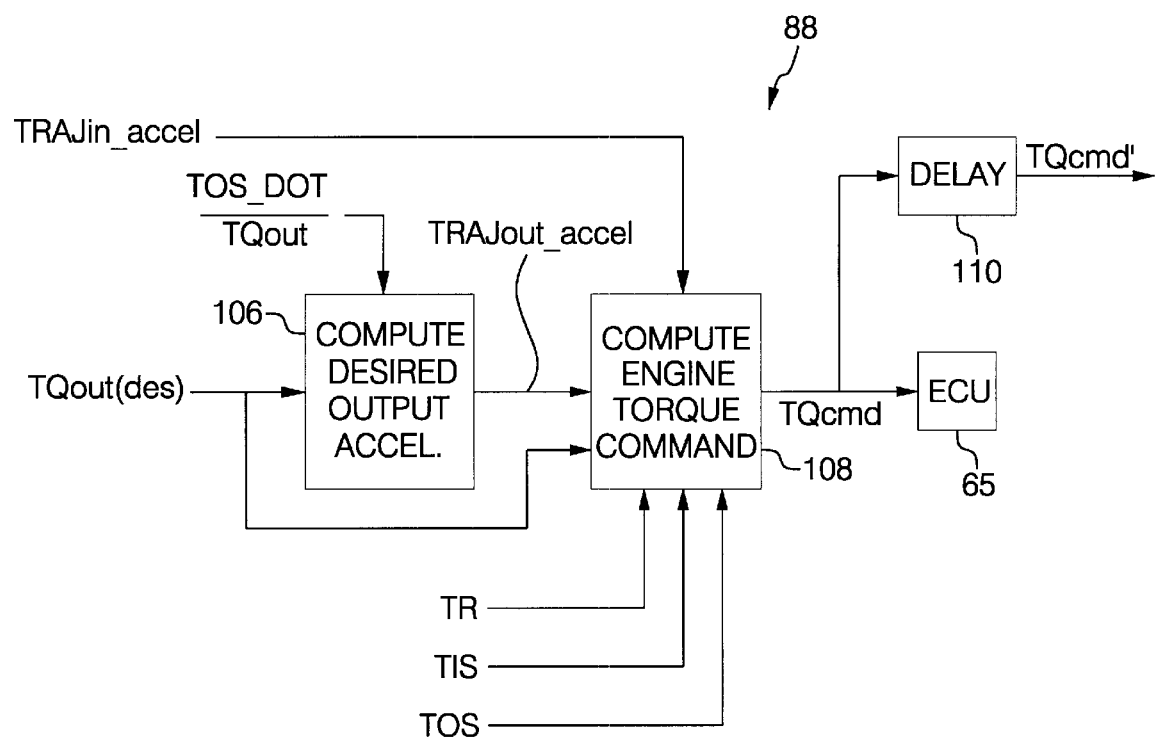

FIGS. 6A and 6B, taken together, depict, a block diagram of the control strategy of this invention, with the various blocks representing functions performed by transmission control unit 66. FIG. 6A is directed primarily to the on-coming clutch pressure control, with the engine torque control being represented by a single block 88. FIG. 6B, in turn, details the engine control block 88.

As explained above, and as indicated in FIGS. 6A–6B, the engine torque and clutch pressure controls are interrelated. For example, the input acceleration trajectory TRAJin_accel is supplied as an input to both the engine torque and clutch pressure controls, and the engine torque command TQcmd is supplied as an input to the clutch pressure control. This allows the control unit 66 to coordinate the engine and transmission controls with the inverse dynamic model equations, as explained below.

The block diagram inputs include the driver torque demand TQ, the engine output torque EOT, the engine speed ES, the transmission input speed TIS, the transmission output speed TOS, and the torque ratio TR of torque converter 16. Various other inputs are derived from these inputs, such as the transmission output acceleration (referred to herein as TOS_DOT), the engine acceleration (referred to herein as ES_DOT), the torque converter speed ratio SR (that is, TIS/ES), and the rate of change of the speed ratio SR (referred to herein as SR_DOT).

The engine torque control is a feed-forward control based on the input acceleration trajectory TRAJin_accel and the desired output torque trajectory TRAJout_tq, and produces a torque command TQcmd which is supplied to the engine control unit 65. The clutch pressure control, on the other hand, combines feed-forward control and feed-back control. The clutch pressure feed-forward control produces a feed-forward pressure command Ponc_FF based on delayed versions (TRAJin_accel', TQcmd') of the input acceleration trajectory TRAJin_accel and the engine torque command TQcmd. The clutch pressure feed-back control produces a feed-back pressure command Ponc_FB by computing an expected input speed TIS(exp) from the desired output torque trajectory TRAJout_tq and comparing the expected speed TIS(exp) to the measured input speed TIS. The feed-forward and feed-back pressure commands are summed to form the on-coming clutch pressure command Ponc.

The desired output torque is determined by blocks 90–93 of FIG. 6A. The blocks 90 and 92 represent functions performed at the initiation of a shift command. The block 90 computes a vehicle loading ratio defined as the transmission output acceleration per unit transmission output torque (TOS_DOT/TQout), which effectively provides an estimate of the vehicle load and mass. The output torque term TQout is computed prior to the initiation of shifting according to the equation:

$$TQout=(K1*TR*EOT)+(K2*TOS\_DOT)+(K3*TR*ES\_DOT)$$

where the constants K1, K2 and K3 are determined by calibration. The block 92 then computes torque scale factors Ki and Kf relating transmission output torque TQout to transmission input torque TQin for the initial and final speed ratios involved in the shift. In other words, Ki defines the ratio TQout/TQin for the initial speed ratio, and Kf defines the ratio TQout/TQin for the final speed ratio. The torque scale factors Ki and Kf are nearly equal to the initial and final speed ratios of the transmission 14, respectively, with some variation due to the effects of engine and transmission inertia. The actual values of Ki and Kf may be computed using the equation:

$$TOS\_DOT=(A*TQin)+(B*Qout),$$

and setting TOS_DOT equal to the product of TQout and the determined ratio (TOS_DOT/TQout) to account for the load and mass effects.

The loading ratio (TOS_DOT/TQout) and the torque scale factors Ki, Kf are applied as inputs along with the torque converter torque ratio TR and the driver torque demand TQ to the block 93, which computes the desired output torque trajectory TRAJout_tq. Computing the desired output torque trajectory TRAJout_tq involves computing the demanded output torque trajectories TQout_dem(i), TQout_dem(f) for the initial (i) and final (f) speed ratios involved in the shift, and then applying the scale factor Ksf to the trajectories. The trajectories TQout_dem(i) and TQout_dem(f) are computed according to the equations:

$$TQout\_dem(i)=Ki*TR*TQ,$$

and $$TQout\_dem(f)=Kf*TR*TQ$$

and the desired output torque trajectory TRAJout_tq is computed according to the equation:

$$TQout(des)=Ksf[TQout\_dem(i)-TQout\_dem(f)]+TQout\_dem(f).$$

The scale factor Ksf may be determined as described above in reference to FIG. 4, and serves to produce a desired output torque trajectory TRAJout_tq that takes into account driver demand, and if desired, driver preference (normal mode vs. towing mode, for example).

In a similar manner, blocks 94–98 compute an initial desired output torque TQout(des_init) for purposes of constructing the input acceleration trajectory TRAJin_accel. In this case, however, the computations are based on the engine output torque input EOT received from engine control unit 65 instead of the driver demand torque TQ so that the acceleration trajectory TRAJin_accel is based on the torque the engine 12 is actually delivering. The blocks 94 and 96 compute output torque values TQout(i), TQout(f) for the initial and final speed ratios involved in the shift, using the equations:

$$TQout(i)=Ki*TR*EOT,$$

and $$TQout(f)=Kf*TR*EOT.$$

The block 98 then computes the initial value of the desired initial output torque TQout(des_init) according to the equation:

$$TQout(des\_init)=K[TQout(i)-TQout(f)]+TQout(f)$$

where K is a calibration parameter.

The input acceleration trajectory TRAJin_accel is determined by the blocks 100–104. Block 100 determines the initial value of the desired torque phase output acceleration, TOS_DOT(des_init), according to the product of TQout(des_init) and the loading ratio (TOS_DOT/TQout). Block 102 computes the initial input shaft acceleration (that is, Ainit) required to produce the desired initial output torque TQout(des_init) and the desired initial output acceleration TOS_DOT(des_init), given the engine torque EOT, engine speed ES, and torque converter parameters. The transmission input and output acceleration values TIS_DOT and TOS_DOT during a shift are modeled according to the equations:

$$TIS\_DOT=(a1*TQin)+(a2*TQcl)+(a3*TQout)$$

$$TOS\_DOT=(b1*TQin)+(b2*TQcl)+(b3*TQout)$$

where a1, a2, a3, b1, b2 and b3 are calibration constants, and TQcl is the torque capacity of the on-coming clutch, assuming an ideal transition between the on-coming and off-going clutches. Solving the model equations to eliminate TQcl, expressing TQin in terms of EOT, ES, TIS_DOT, and the torque converter parameters SR and SR_DOT, and solving for TIS_DOT yields an expression for Ainit in terms of TQout(des_init), TOS_DOT(des_init), EOT, ES, SR, SR_DOT, and calibration constants Ka–Ke, as follows:

$$Ainit=[Ka*TR*(EOT+Kb*ES*(SR\_DOT/SR))+Kc*TQout+Kd*TOS\_DOT]/(1+Ke(TR/SR))$$

The initial desired acceleration Ainit is computed repeatedly during the fill phase of the shift to account for any changes in EOT and/or TOS_DOT, and a value of Ainit at the end of the fill phase is supplied as an input to block 104. The output of block 104 is the input acceleration trajectory (TRAJin_accel), and the trajectory value is maintained at Ainit until the input speed TIS begins to change toward the new speed ratio SRnew (that is, until the onset of the inertia phase of the shift). Thereafter, the block 104 repeatedly computes the trajectory TRAJin_accel based on the computed slip speed SLIP of the on-coming clutch and the trajectory parameters Ainit, Afnl, Tinit, Tshift, and Tfinal. The slip speed SLIP at any time t is computed in accordance with the equation:

$$SLIP(t)=(TOS*SRnew)-TIS+[Atgt*(Tshift-t)]$$

where Atgt is the target acceleration of the transmission input shaft 18 (computed as the product TOS_DOT * SRnew) and Tshift is the selected duration of the inertia phase. The acceleration trajectory parameter Amax, in turn, is computed so that the area under the acceleration trajectory is equal to SLIP. The trajectory parameters, including Atgt, SLIP and Amax, are computed periodically during the shift to reflect any changes in the output acceleration TOS_DOT.

The input acceleration trajectory TRAJin_accel and the desired output torque trajectory TRAJout_tq are applied as inputs to the engine torque control block 88. Referring to FIG. 6B, the block 106 computes a desired output acceleration trajectory TRAJout_accel based on the desired output torque trajectory TRAJout_tq according to the product of TRAJout_tq and the loading ratio (TOS_DOT/TQout). The block 108, in turn, computes the engine torque command TQcmd based on TRAJin_accel, TRAJout_accel and TRAJout_tq. As in the computation of Ainit, this involves solving the transmission model equations to eliminate TQcl, expressing TQin in terms of EOT, ES, TIS_DOT, and the torque converter parameters SR and SR_DOT. Only here, the equation is solved for EOT in terms of TRAJout_tq, TRAJin_accel, TRAJout_accel, ES, TR, SR, SR_DOT, and calibration constants K1–K5, as follows:

$$TQcmd=(K1+K2*TR/SR)(TRAJin\_accel/TR)+K3*(TRAJout\_tq/TR)+K4*ES*SR\_DOT/SR+K5*(TRAJout\_accel)/TR$$

The torque command TQcmd so computed represents the engine torque for satisfying the trajectories TRAJout_tq, TRAJin_accel, TRAJout_accel, given the engine speed ES and the torque converter parameters, and is supplied as an input to engine control unit (ECU) 65. As explained below, the on-coming clutch torque Tcl is solved using the same model equations, with the engine torque term being set equal to a delayed version TQcmd' of the torque command TQcmd and the input acceleration term being set equal to the delayed version TRAJin_accel' of the input acceleration trajectory. Thus, the output of block 108 is also supplied as an input to the delay block 110, which forms TQcmd'. The reason for the delay is that the response time of the clutch pressure control is typically faster than the response time of the engine torque control. In other words, the premise is that the system 44 can achieve a commanded on-coming clutch pressure Ponc faster than the engine control unit 65 can achieve a commanded engine output torque TQcmd. Accordingly, the clutch torque Tcl is based on a delayed version of the torque command TQcmd sent to engine control unit 65.

Delay block 111 forms a delayed input acceleration trajectory TRAJin_accel' for use by the torque clutch computation block 112, thereby accounting for the above-described difference in response times of the clutch pressure and engine torque controls. The block 112 uses the transmission model equations to compute an on-coming clutch torque command Tcl that will satisfy the delayed input acceleration trajectory TRAJin_accel', given the delayed engine torque command TQcmd' and the torque converter characteristics. The basic model equations are the same as those given above in respect to block 102, but in this case, the equations are solved for the on-coming clutch torque TQcl, yielding:

$$TQcl=[K1+K2(TR/SR)]TRAJin\_accel'+[K3*TR*TQcmd']+[K4*TR*SR\_DOT*ES/SR]$$

where K1, K2, K3 and K4 are constants (including the mass/load ratio TOS_DOT/TQout). The clutch torque TQcl, in turn, is applied to block 114, which outputs the feed-forward pressure Ponc_FF. In the illustrated embodiment, the block 114 represents a look-up table of clutch pressure vs. clutch torque for the particular on-coming clutch, and comprises a discrete number of data points forming a piece-wise linear approximation of the pressure vs. torque relationship. As indicated by the broken line 116, the data points are subject to adaptive adjustment based on the closed-loop speed error, as a means of compensating for any modeling errors of blocks 88 and 112.

The on-coming clutch feed-back control comprises the blocks 118–128, and is based on the comparison of the measured input speed TIS with an expected input speed derived from the engine output torque EOT and the output torque trajectory TRAJout_tq. The delay block 118 develops a delayed version (TRAJout_tq') of the output torque trajectory TRAJout_tq, the duration of the delay being representative of the combined electrical and hydraulic delays incurred in producing the commanded on-coming pressure Ponc. In other words, the value of TRAJout_tq' at any time during the shift represents the expected output torque, assuming that the model equations are accurate and that the feed-forward control is faithfully carried out. The block 120 uses the delayed output torque trajectory TRAJout_tq' and the engine output torque EOT to compute the corresponding input acceleration, referred to herein as the expected input acceleration, or TIS_DOT(exp). This involves solving the same equation as discussed above in reference to block 102, with the output torque being given by TRAJout_tq', the output acceleration being given by the product of TRAJout_tq' and the loading ratio (TOS_DOT/TQout), as follows:

$$TIS\_DOT(exp)=[Ka*TR*(EOT+Kb*ES*(SR\_DOT/SR))+[Kc*TRAJout\_tq']+Kd*TRAJout\_tq'*(TOS\_DOT/TQout)]/(1+Ke(TR/SR))$$

The block 122 then integrates the expected input acceleration TIS_DOT(exp) to form an expected input speed (TISexp), using a conventional discrete trapezoidal integration technique, as represented by the equation:

$$TISexp(\text{current})=TISexp(\text{last})+T/2[TRAJ(\text{current})+TRAJ(\text{last})]$$

where TISexp(current) and TISexp(last) are the current and last values of the expected input speed, T is the update rate, and TRAJ(current) and TRAJ(last) are the current and last values of the expected input acceleration TIS_DOT(exp). The expected input speed so developed is then applied along with the measured input speed TIS to summer 124, forming an input speed error ERR. The block 126 applies a proportional gain term to ERR to form the feed-back pressure component Ponc_FB, which is combined with Ponc_FF in summer 128 to form the pressure command Ponc. The pressure command Ponc, in turn, is applied as an input to the block 130, which develops a current command for the respective modulator valve 62, 64.

In summary, the control of this invention uses an inverse dynamic model of the transmission to compute the engine torque and on-coming clutch pressure required to achieve a desired output acceleration trajectory during an upshift. The shifting calibration effort is greatly simplified as compared with known open-loop controls, and the engine and on-coming clutch controls are inherently coordinated. Any modeling errors of the feed-forward control are detected in the form of closed-loop error, and the control compensates for steady-state errors through corresponding adjustment the feed-forward control—specifically, the data points of the clutch pressure vs. clutch torque transfer function table (block 114).

While described in reference to the illustrated embodiment, it will be understood that various modifications in addition to those mentioned above will occur to those skilled in the art. For example, various parameters, such as engine torque, vehicle loading, and the torque converter characterization may be determined by alternative methods than disclosed herein. Additionally, the expected input shaft speed TIS(exp) could be computed from the input acceleration trajectory TRAJin_accel, if desired. Thus, it will be understood that controls incorporating these and other modifications may fall within the scope of this invention, which is defined by the appended claims.

What is claimed is:

1. A method of controlling an on-coming clutch pressure during an inertia phase of an upshift of a motor vehicle automatic transmission having an input shaft coupled to a vehicle engine and an output shaft coupled to drive the vehicle, the method comprising the steps of:

developing a desired torque trajectory of the output shaft;

developing a desired acceleration trajectory of the input shaft;

applying the desired torque trajectory and the desired acceleration trajectory to an inverse dynamic model of the transmission to determine an engine output torque command;

commanding engine output torque in accordance with the determined engine output torque command;

applying the desired acceleration trajectory to the inverse dynamic model of the transmission during the inertia phase of the upshift to obtain an estimate of a required on-coming clutch pressure at the commanded engine output torque;

developing a feed-forward clutch pressure command based on the estimated clutch torque; and developing on-coming clutch pressure in accordance with the pressure command.

2. The method of claim 1, wherein the step of applying the desired acceleration trajectory to the inverse dynamic model of the transmission includes the steps of:

delaying the commanded engine output torque and the desired acceleration trajectory; and applying the delayed desired acceleration trajectory and the delayed commanded engine ouput torque to the inverse dynamic model to obtain the estimate of the required on-coming clutch pressure.

3. The method of claim 1, including the steps of:

measuring a speed of the input shaft;

determining an expected speed of the input shaft; and adjusting the pressure command in accordance with a feed-back adjustment based on a deviation of the measured speed from said expected speed to compensate for errors in said dynamic model.

4. The method of claim 3, wherein the step of determining an expected speed of the input shaft comprises the steps of:

delaying the output torque trajectory to estimate the expected output torque;

computing an expected input acceleration based on the expected output torque and the engine output torque; and and integrating the expected input acceleration to determine the expected speed of the input shaft.

5. The method of claim 1, where the step of applying the desired torque trajectory and the desired acceleration trajectory to an inverse dynamic model of the transmission to determine an engine output torque command includes the steps of:

determining a desired output acceleration trajectory based on the desired output torque trajectory; and applying the desired output acceleration trajectory, the desired torque trajectory and the desired input acceleration trajectory to the inverse dynamic model to determine the engine output torque command.

* * * * *